United States Patent [19]

Lyng

[11] 4,272,577
[45] Jun. 9, 1981

[54] PLASTIC NON-WAX SKI BASE AND METHODS FOR ITS MANUFACTURE

[75] Inventor: Stig Lyng, Oslo, Norway

[73] Assignees: Andelslaget for Norsk Skiforskning, and Sentralinstitutt for Industrielle Forskning, Oslo, both of Norway

[21] Appl. No.: 915,306

[22] Filed: Jun. 12, 1978

[30] Foreign Application Priority Data

Jun. 10, 1977 [NO] Norway .............................. 772044
Jan. 2, 1978 [NO] Norway .............................. 780006
Jan. 5, 1978 [NO] Norway .............................. 780044

[51] Int. Cl.³ .......................................... B32B 5/16
[52] U.S. Cl. .................................. 428/112; 280/604; 280/609; 280/610; 264/108; 428/114; 428/217; 428/323; 428/324; 428/325; 428/326; 428/327; 428/363
[58] Field of Search ............... 428/324, 325, 363, 326, 428/327, 317, 323, 112, 114; 280/609, 604, 610; 264/108

[56] References Cited

U.S. PATENT DOCUMENTS

| | | | |
|---|---|---|---|
| 2,668,328 | 2/1954 | Porter | 264/108 |
| 2,977,264 | 3/1961 | Shapero | 428/325 |
| 3,168,509 | 2/1965 | Juel | 264/108 |
| 3,272,522 | 9/1966 | Kennedy | 280/610 |
| 3,408,086 | 10/1968 | Bennett | 280/604 |
| 3,858,894 | 1/1975 | Ver | 280/604 |
| 3,897,074 | 7/1975 | Tiitola | 208/11.13 L |
| 3,902,732 | 9/1975 | Fosha | 280/610 |
| 4,077,652 | 3/1978 | McCaskey | 428/433 |

FOREIGN PATENT DOCUMENTS

| | | | |
|---|---|---|---|
| 317734 | 9/1974 | Australia . | |
| 1139914 | 1/1969 | Canada | 264/108 |
| 2114319 | 9/1972 | Fed. Rep. of Germany . | |
| 2602652 | 7/1977 | Fed. Rep. of Germany | 280/610 |
| 112402 | 12/1967 | Norway . | |
| 123702 | 4/1972 | Norway . | |
| 133350 | 12/1976 | Norway . | |
| 541337 | 10/1973 | Switzerland . | |
| 555186 | 10/1974 | Switzerland . | |
| 567427 | 10/1975 | Switzerland . | |

OTHER PUBLICATIONS

"Mica-The New Waxless Base"; Ski X-C, p. 56, Fitzgerald Communications Inc., Schenectady, N.Y., 1978.

*Primary Examiner*—Ellis P. Robinson
*Attorney, Agent, or Firm*—Wenderoth, Lind & Ponack

[57] ABSTRACT

A no-wax ski base is formed of a composite material in which relatively harder particles are uniformly distributed in a plastic matrix. The harder particles are angularly oriented with respect to the gliding surface of the ski base to provide a unidirectional friction coefficient that combines good gliding properties in the ski forward direction with good grip properties in the backward or "kick off" direction of the ski. These friction properties are maintained throughout the entire life of the ski base irrespective of wear. The ski base may be manufactured by extruding the plastic composite material through a split nozzle while causing it to flow substantially asymmetrically through the split nozzle to obtain the angular orientation of the harder particles in the plastic matrix.

13 Claims, 8 Drawing Figures

$V_I = V_{II} < V_{III}$

PLASTIC NON-WAX SKI BASE AND METHODS FOR ITS MANUFACTURE

BACKGROUND OF THE INVENTION

The present invention relates to a waxless ski base of a plastic composite material and methods of making such a base.

Plastic ski base materials generally have satisfactory glide properties against snow irrespective of snow conditions. These properties are in fact optimally utilized on alpine and jumping skis. However, the excellent gliding properties of plastic ski base materials against snow represents a significant problem when used on skis of the cross country or touring type, since it is a requirement for such skis that they do not slip or slide backwards in the kick off phase of the skier's movements, particularly when climbing a slope.

Up to the present time, two different procedures have been employed in order to avoid slip or back sliding of glassfibre armed skis with a plastic base of the cross country or touring type. One procedure is to obtain the necessary grip properties by use of a suitable ski-wax. The other procedure involves the provision of a no-wax plastic base, i.e. a base of such a nature or configuration that the desired frictional properties are obtained without the need for waxing the gliding surface.

Attempts have been made to provide improved wax-adhering plastic bases by imitating the porous fibre structure of the wooden ski by adding various filling components, such as randomly arranged fibres of a textile material. Further, a plastic base has been suggested which comprises a matrix having particles embedded therein which may be aligned in certain directions, for instance longitudinally of the ski. The particles, which may be in the form of fibres or flakes, are supposed to be soluble in water. When using such skis, wear will expose the particles which then dissolve and leave open pores in the sole to improve adherence of ski wax.

In ancient times no-wax ski were obtained by attaching fur strips to the mid portion of the ski base. In modern skiing this principle has been utilized for example by using a plush like fabric in a plastic matrix, as disclosed in Austrian patent No. 317,734, the fabric fibres and the matrix combining into a composite material forming the base. During wear of such base materials a three-dimensional patterned ski-profile is formed, the fibres protruding slightly from the matrix and presenting a patterned micro structure which also facilitates waxing. According to this arrangement the fibres may be oriented in a direction such that the friction coefficient will be lowest in the forward direction of movement. However, nothing is mentioned as to how the fibres can be ordered during production. The disclosed structure will provide a friction coefficient that is equal in the backward directions. Directionally oriented fibres admittedly will provide an anisotropic friction coefficient, but such a pattern is assumed to have little effect.

A satisfactory solution of the adherence to snow of non-wax plastic skis has previously been achieved by mechanically forming a plurality of indentations and hills in the ski base. The indentations each terminate in a steep edge to produce an accumulated effect resulting in a higher friction against than in the speed directions. The indentations, together with the flat, glide portions of the base, form a direction dependent pattern having as a result an anisotropic friction coefficient. A well-known system of this type has a fish scale like structure. However, such systems have the general drawback that the three-dimensional pattern is relatively rapidly worn down. In addition all such systems produce scraping, vibration and an irritating "singing" noise in the ski track.

SUMMARY OF THE INVENTION

The object of the present invention is to provide a composite material for a waxless base, which upon wear presents and maintains a pattern which in principle corresponds to a mechanically formed pattern.

Thus, according to the invention, there is provided a ski base made up of a matrix of a plastic material with relatively harder directionally oriented particles embedded therein, the matrix and particles defining a composite material having areas of varying hardness which, upon wear including pre-treatment, from a three-dimensional patterned gliding surface with direction-dependent friction coefficients. The ski base according to the invention is characterized by the particles having an individual extension over not more than a part of the base thickness, and forming mutually offset and spaced harder areas across the thickness of the base, such areas being gradually exposed during wear and thus securing an effective base surface configuration and friction coefficient against snow during the entire service life of the ski.

The invention also provides a method for the manufacture of the composite ski base according to the invention, by extruding a molten thermoplastic material through a slit nozzle for forming the base, and the method is characterized by mixing into the plastic material prior to the extrusion thereof particles which are harder than the matrix after setting, for the formation of a composite material consisting of harder particles in a plastic matrix to form a base material, and by causing the composite material to flow through the slit nozzle with a substantially asymmetrical or skewed flow profile, whereby the particles are obliquely oriented in the plastic matrix relative to the intended gliding surface of the base.

BRIEF DESCRIPTION OF THE DRAWINGS

Further objects and advantages of the invention will be readily apparent from the following detailed description of some embodiments thereof with reference to the drawings in which.

DETAILED DESCRIPTION OF THE INVENTION

Figure 1:
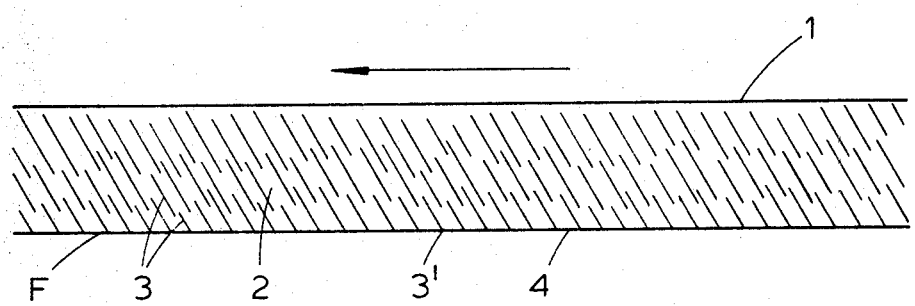
FIG. 1 is a schematic fragmentary sectional view of a ski base according to the invention.

The principle upon which the invention is based appears from FIG. 1 in which the numeral 1 generally denotes a ski base of a composite material consisting of a plastic matrix 2 with embedded particles 3 of a harder or more wear resistant material than the matrix material.

The plastic matrix 2 may be any conventional thermosetting plastic or thermoplastic material. However, thermoplastic is a preferred material, e.g. polyethylene.

The embedded particles 3 may be in the form of bands or flakes, for example mica flakes, graphite flakes, flakes made from glass, or even wood shavings. Alternatively the particles may be in the form of needle crystals or fibres, e.g. glass fibres.

In addition to the above mentioned hard particles, artificially made needles, bands and flakes of a high melting, hard and abrasion resistant plastic material can be used as the particle addition.

Plastic materials with a hydrophobic surface, as for instance polyphenylensulfide, PPS, polyphenylenoxide (PPO), polybutylenterephtalate (PBT) or even ultrahighdensity polyethylene (UHDPE), are some of the numerous possibilities.

In the embodiment schematically illustrated in FIG. 1 the particles 3 are evenly distributed in the matrix 2, and they are inclined with respect to the gliding surface F of the base, i.e. the particles slant forward in the intended speed direction (indicated by an arrow).

During use of a ski having a plastic base 1 of the type described above and illustrated in FIG. 1, the matrix portions between the harder particles 3 in the gliding surface F of the base 1 will be worn more quickly than the particles 3, so that a three-dimensional pattern is formed on the gliding surface in which exposed portions 3' of the particles 3 will form a part of the gliding surface and define the contour of the pattern around pit-formed areas 4 between the particles.

Owing to the oblique orientation of the exposed portions 3' in the gliding surface of the base, the ski will have a substantially lower friction coefficient in the intended speed or forward direction than in the "kick off" or rearward direction. Thus, the same effect is obtained as that of a prior no-wax base having a pattern in the gliding surface.

Contrary to the old no-wax base types, however, the pattern of the base 1 according to the invention will not deteriorate upon further wear of the base gliding surface or tread F, since new portions 3' of the particles 3 will be exposed at the same rate at which previously exposed portions 3' are worn down.

Preferably, in order to ensure that the base exhibits the desired anisotropic friction properties from the beginning of use of the base, the base surface, after having been glued to the ski underside, will be ground or scraped in the direction of the speed.

The embedded particles 3 preferably have a maximum extent or particle size from about 0.3 mm to about 2.5 mm, 0.5-1.2 mm being the most preferred range.

The above described ski base may conveniently be made by extruding the premixed particle-plastic composite material through a slit nozzle having an exit opening cross section approximately equal to the intended thickness of the ski. In one aspect of the method according to the invention the composite material is caused to flow through the exit portion of the extruder nozzle with an asymmetrical or skewed flow-profile. Flow-profile in this context is defined as the velocity distribution of the material flow across the nozzle height.

Figure 2:
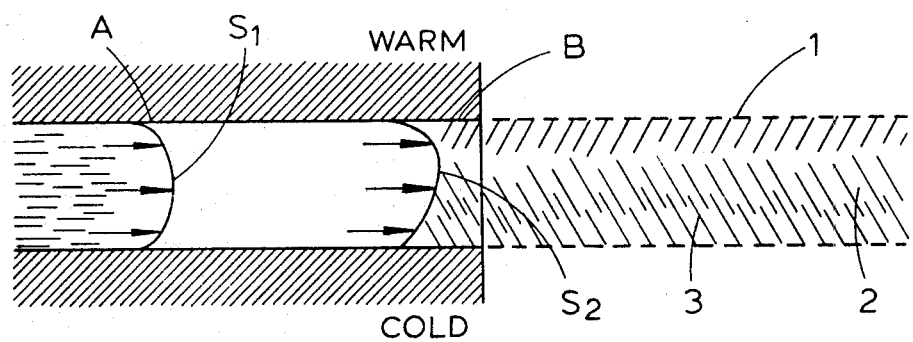
FIGS. 2-5 illustrate alternative methods of making a ski base according to the invention.

Such an asymmetric flow-profile may be obtained in a number of different ways. One possible way is to vary the nozzle wall temperature as indicated in FIG. 2, for example by cooling one of the nozzle walls. In the inlet portion A of the nozzle the molten composite material will have a symmetrical flow-profile as graphically represented by the curve $S_1$ in FIG. 2, and the randomly oriented particles 3 will be aligned substantially parallel with the flow direction thereat. Further within the nozzle, however, an asymmetric flow-profile will occur as graphically represented by the curve $S_2$, owing to the influence of the temperature gradient on the viscosity of the plastic flow.

The asymmetric flow-profile $S_2$ in its turn will affect the orientation of the particles 3 in the plastic flow, causing them to rotate their leading ends down toward the colder nozzle wall, and thus, at the nozzle exit B, to a assume the above described angular position with respect to the main surface of the extruded base. In a zone near the warmer nozzle wall the particles 3, probably because of friction effect against the nozzle wall, will be rotated in the opposite direction as shown in FIG. 2. This latter zone of the base material will normally be removed by grinding prior to attachment of the base to the rest of the ski and is not a part of the actual ski base.

The slant angle assumed by the particles in the matrix material relative to the gliding surface will depend on the temperature difference across the nozzle height, and tests have provided that a temperature difference of about 30° to 50° C. between the top and bottom nozzle walls produces a favourable slant angle of about 15° relative to the base sliding surface.

Other possible ways of causing an asymmetrical flow-profile for the composite material melt through an extruder nozzle is to have nozzle walls having different friction coefficient in contact with the plastic melt, for example by using nozzle walls of different materials, or of different surface properties, or by using two different polymers of the same type but having unequal flow properties (melting index).

In practice, when carrying out the above described method with particles 3 in the form of mica flakes in the plastic melt, the slant angle of the mica flakes has proved to be more easily controlled in the extruding process, if the extruded base material has a thickness greater than the usual thickness of conventional plastic base material of a ski (1-1.4 mm). Thus, it has been found advantageous to extrude a base material of a thickness substantially twice the normal thickness, and then immediately split the base longitudinally into two single strands of normal thickness. In this case a more pronounced plough-form of the flake orientation is achieved. Such plough-form may be achieved by using a smaller temperature difference across the nozzle section than indicated above, e.g. a temperature difference of about 10° C. and at the same time a somewhat higher absolute temperature in the plastic melt, e.g. 20° C. above the temperature used when extruding a single base. Due to flow mechanism the central zone of the double base material will be practically free from mica flakes.

Figure 3:
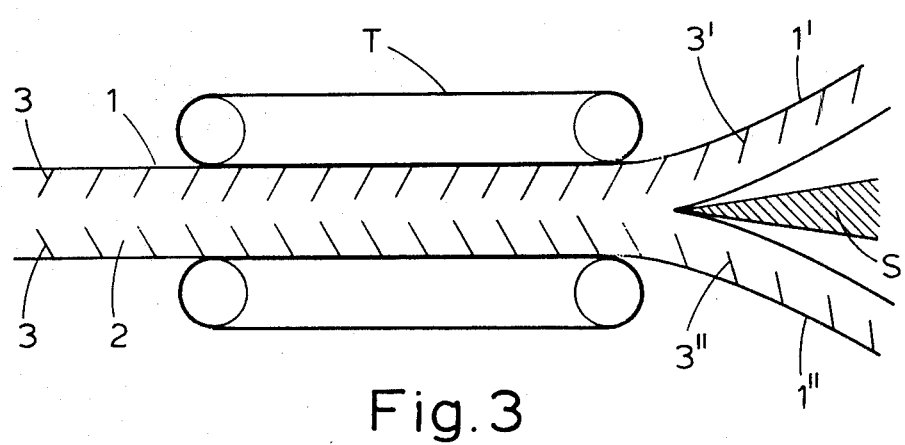

FIG. 3 illustrates schematically how the splitting of the double base may be carried out. The double base containing flakes 3 in a plough-form orientation as indicated above is lead from the extruder (not shown in FIG. 3) through ordinary transport mechanism T, for example in the form of belts or rolls. Centrally of the exit opening of the belt or rolls T is disposed a split mechanism S, for example a knife or preferably a heating wire, which splits the base material along its relatively flake-free central zone into single strands 1' and 1" of substantially equal thickness, and having substantially unidirectional slanting mica flakes 3' and 3", respectively.

Figure 4:
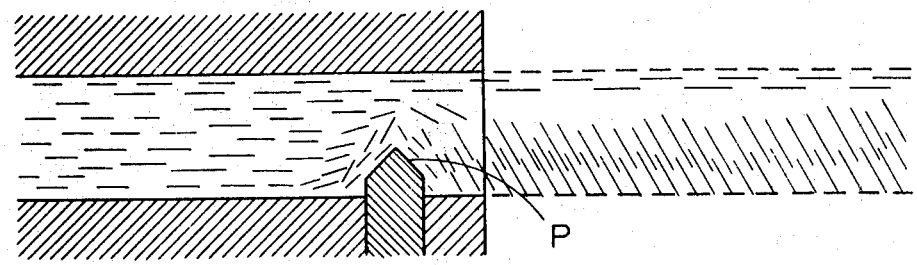

An alternative method for obtaining the desired asymmetrical flow-profile $S_2$ is to reduce the extruder nozzle cross section as illustrated in FIG. 4, for example by inserting a weir plate P extending a certain distance into the nozzle passage from one of the nozzle walls.

A third way of obtaining the desired orientation of the particles 3 in the non-wax ski base according to the invention is by means of a calander. The composite material consisting of a plastic melt with mixed-in particles 3 is pressed in normal manner through a conventional extruder nozzle, without any means to cause an asymmetrical flow-profile as in the previous examples. Consequently, the particles 3 in the base will mainly have a random orientation upon leaving the extruder, perhaps with a certain tendency to align in the direction of flow, i.e. substantially parallel to the main surfaces.

Figure 5:
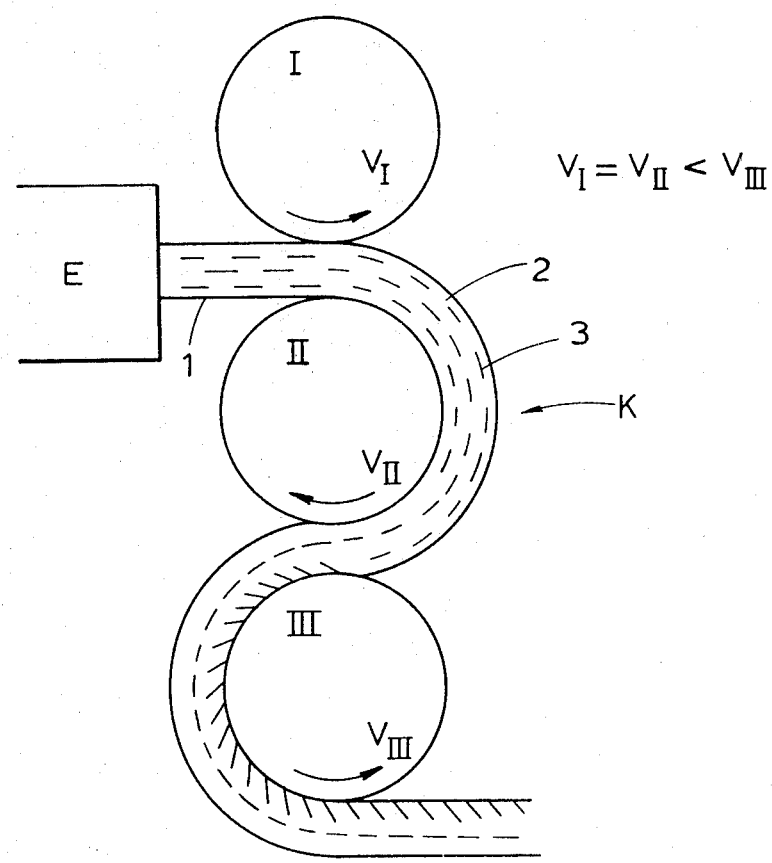

As illustrated in FIG. 5 the calander K may conveniently include three rolls I, II and III, of substantially equal diameter. The rolls I and II have the same rotational speed while roll III is rotating at a higher speed. In the nip of the first cooperating pair of rolls I and II the extruded and still melted plastic composite material 1 emerging from the extruder E will be subjected to a stretching action which imparts a parallel orientation to the particles 3 in the plastic matrix 2. In the nip of the next cooperating pair of rolls II and III the higher circumferencial speed of the latter roll will produce a force acting to raise the particles 3 into a slanting position in the plastic matrix. The slant angle may be controlled by varying the speed of the roll III with respect to roll II.

In order to secure a good adhesion of the particles 3 in the plastic matrix 2, the particles, prior to intermixing with the plastic melt, are preferably surface treated with a suitable coupling agent, for example of the silane type. Alternatively, or in addition to the above treatment, radioactive γ-radiation may be used for the same purpose.

For some snow conditions a marked increase in the friction of the base material against snow occurs when the temperature drops below −4° to −7° C. (depending on the humidity of the surrounding air). One of the reasons might be static electric charging of the plastic base. Static electricity occurs with dry snow conditions and causes, for example, small upright plastic bristles to extend from bases with mica flakes. In this connection it is verified that such bristles also occur at other snow and temperature conditions but in the latter cases the bristles lie along the base surface during gliding and are raised/turned in the "kick-off" phase of the skier's movements. The bristles consist of minor plastic fibres formed upon grinding or wear of the base surface, in the area around the embedded particles in the gliding surface. By introducing 2-8% of carbon black in the plastic melt together with the particles 3, the completed base material will have an electric conductivity sufficiently high to avoid static electricity such that glide and grip properties will be about the same as for wet snow conditions. Further, the base may advantageously be subjected to radioactive γ-radiation for optimum wear properties and service life.

The following example is typical of the invention: 25 parts by weight of mica (Biotite) having a grain size of 0.5 to 1.2 mm was mechanically mixed with a granulate of polyethylene (PEL-PEM-PEH). The resulting mixture or composite material was then extruded into a base material of 60×1.7 mm by means of a slit nozzle with one nozzle wall cooled as previously explained in connection with FIG. 2, for obtaining an asymmetric flow-profile. In order to obtain a good adhesion between mica and polymer, the mica particles were treated with a silane before extrusion. Subsequent γ-radiation resulted in a chemical binding between mica and polymer.

Figure 6:
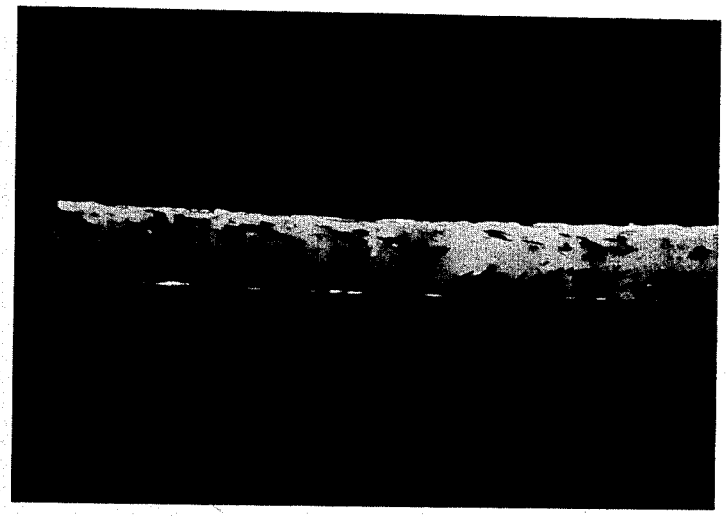
FIG. 6 is a fragmentary sectional photomicrograph of an actual ski base according to the invention.

The photomicrograph reproduced in FIG. 6 indicates the inclined orientation of the mica flakes in the extruded base material after setting of the plastic matrix. The base was cut to size, bounded to a ski and ground as previously explained. This ski was compared to a ski with a mechanically formed no-wax base of prior type, in friction tests on a snow base. The tests gave the following results:

|  | Fine grained new snow, −3° C. | |
|---|---|---|
|  | Prior sole | New sole |
| Friction coefficient in forward direction | 0.13 | 0.13 |
| Friction coefficient in "kick off" direction | 0.31 | 0.38 |

The test results reveal a marked lower friction coefficient in the forward or glide direction of the ski than in the opposite or backward direction for the new ski base according to the invention. The results further reveal that the ratio of coefficient of friction in the glide and grip directions of the new no-wax base is better than that of the prior no-wax base.

Figure 7:
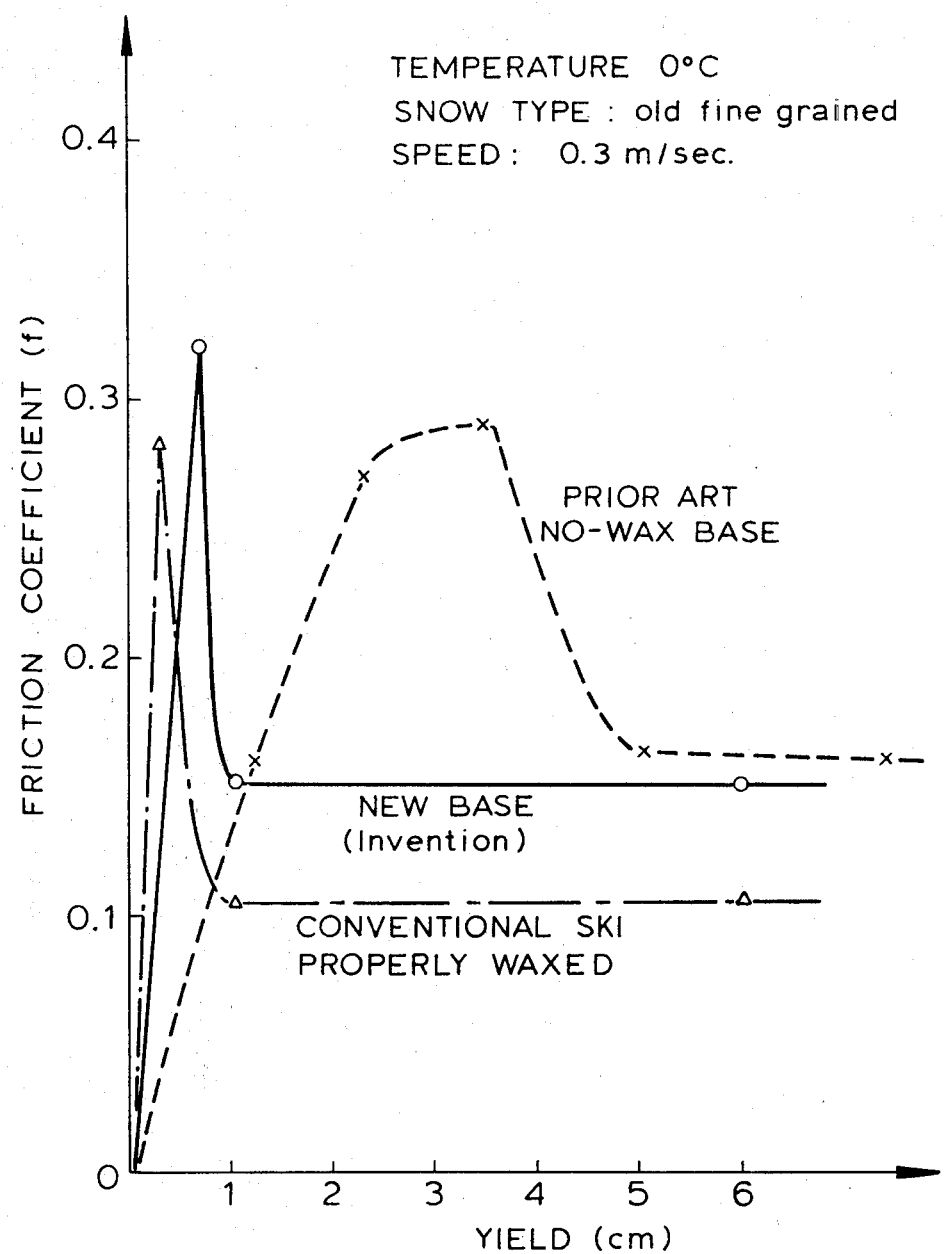
FIG. 7 is a diagram illustrating the grip characteristics of the base according to the invention, compared to a no-wax base of prior type and a conventional properly waxed ski base.

An important advantage specific to the no-wax ski base of the invention is illustrated in the diagram of FIG. 7 which graphically depicts the building up of the friction coefficient in the "kick off" or grip phase of the ski motion (i.e. in the backward direction) for the new ski base compared to a prior, mechanically indented no-wax ski base. The diagram is based on laboratory tests performed at a temperature of approximately 0° C., on oldfine-grained snow, and at a speed of 0.3 m/sec. It appears from the diagram that the friction coefficient of the prior sole is gradually built up over a backward slip of about 1-3 cm on the given snow base. In practice this means that the ski yields a little in the "kick off" direction before gripping, resulting in a vague and discomforting "kick off" motion. On the other hand the base according to the invention "sticks" immediately and then drops off to a lower friction value. This implies that when the ski slips it slips like a properly waxed ski, which also appears from the diagram. Most skiers will strongly prefer the steep friction gradiant of the new no-wax base and the properly waxed sole, since it allows a more rapid and effective "Kick off". The grip for the new non-wax ski is somewhat better than for the properly waxed ski.

The excellent properties of a ski provided with the plastic no-wax base according to the invention are further illustrated by the results of practical field tests in which two no-wax skis of prior type, denoted type A and type B respectively in the table below, were compared to a ski having a base according to the present invention, denoted type C below. In the tests three cross country skiers gave their subjective impressions of the grip properties of the skis in the "kick off" phase, in the form of marks (counts) as follows. Very good (3), Good (2), Poor (1). These marks were then related to the glide properties of the skis in the forward or speed direction, measured by the time taken to glide down a slope of predetermined length. The results were as follows:

|  | Skier | Type A | Type B | Type C |
|---|---|---|---|---|
|  | I | V. good (3) | Good (2) | V. good (3) |
| Grip | II | Good (2) | Poor (1) | V. good (3) |
| Test | III | V. good (3) | Good (2) | Good (2) |
|  | Average F | 2.67 | 1.67 | 2.67 |
|  | Glide test (Average sec.)$^G$ | 16.03 | 13.50 | 14.68 |
|  | Ratio $\frac{G}{F}$ | 6.01 | 8.10 | 5.50 |

Figure 8:
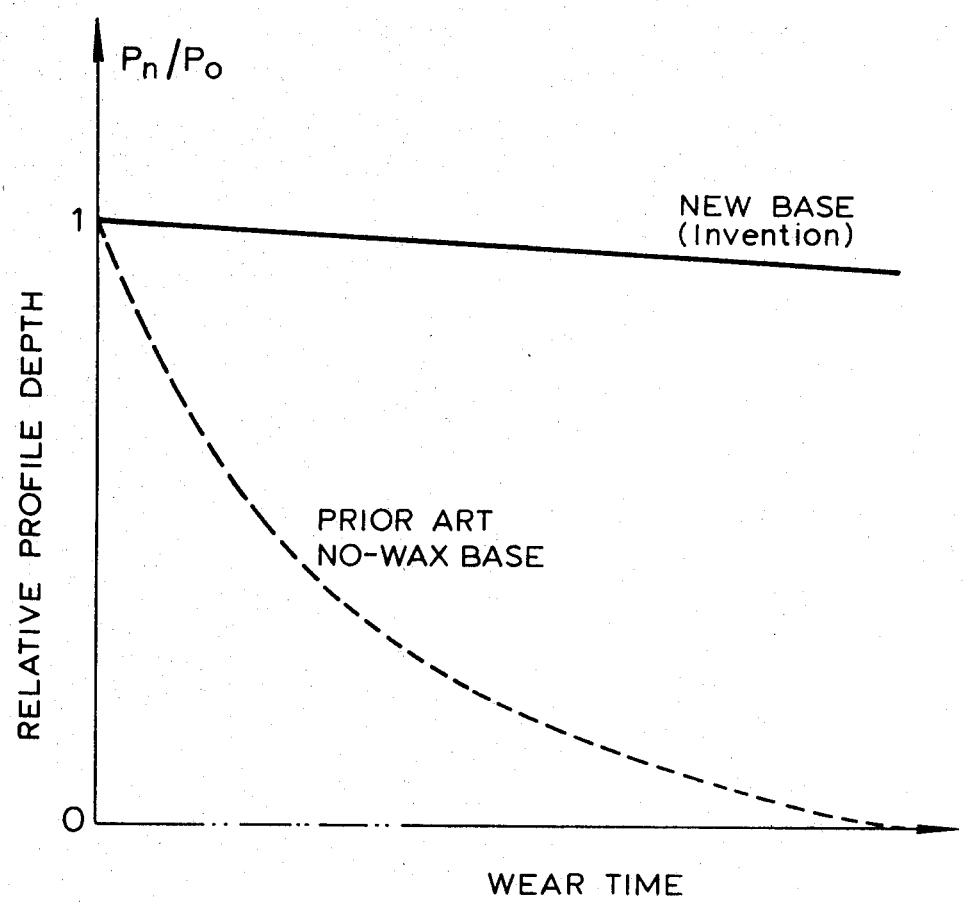
FIG. 8 is a diagram illustrating the wear characteristics of the base of the invention compared to a prior no-wax base.

A further remarkable feature of the no-wax plastic ski base according to the invention is its excellent wear resistance. In order to illustrate the superior wear resistance of the new base the curves of the diagram in FIG. 8 show the wear development of the new no-wax plastic base according to the invention compared to a prior no-wax plastic base of the "indented" type, as obtained by laboratory tests based on accelerated wear. The diagram indicates that the relative profile depth $P_n/P_o$, i.e. the remaining profile depth of the three-dimensional base pattern relative to the original profile depth, is practically unaffected for the new base, while quickly approaching zero for the prior base. Although such an accelerated laboratory test only provides an approximate picture of the actual base wear on snow, it indicates that the new base will remain effective in use long after the no-wax properties of the prior base have vanished due to wear.

Even though the above described ski base according to the invention has proved very efficient as to glide and grip on most snow conditions, the glide is somewhat inferior relative to an ordinary waxed base, particularly on cold snow. However, a marked improvement in the glide properties may be obtained by post-treating or polishing at least a front portion and a rear portion of the base glide surface, by means of a grindstone or similar tool which is pressed against the base glide surface while moving it from the front to the rear of the base.

The improved glide properties obtained by this post-treatment are substantially due to cold flow and possibly some hot flow occuring in the base surface layer, causing a thin plastic film to be drawn over the embedded particles in the treated base surface portion, resulting in a lower friction coefficient for these portions. A contributory cause is the fact that also a certain stretching takes place of the plastic material in the treated portions, such that the inclined particles in the area at the base glide surface are further unidirected and reoriented parallel to the glide surface.

The above mentioned polishing is preferably carried out as a final treatment after the base has been secured to the ski. An ordinary rotating grindstone may conveniently be used in the post-treatment. The base surface is thus pressed against the stone grinding surface with the latter moving in a direction toward the back of the base while at the same time moving the ski forward for succesive grinding action on the base portions to be treated. Naturally the treatment may be carried out by other means, such as a conveniently shaped grinding block which is moved under pressure along the base portions to be treated.

The longitudinal extent of the post treated portions at the front and rear of the base may each conveniently represent about a quarter to a third of the total base length. The untreated mid portion of the base surface will then for most conditions provide a sufficient grip in the "kick off" phase. However, the treated length may of course be varied to suit various user needs, in view of the fact that a competition skier with a vigorous "kick off" generally will prefer a base that is treated over more extensive portions than would suit an ordinary touring skier.

I claim:

1. A no wax ski base comprising a matrix of plastic material having embedded therein elongated particles of a material harder than said plastic material, said matrix and particles defining a composite material having areas of varying hardness, said particles being angularly oriented within said matrix, said particles having longitudinal dimensions of a minimum size sufficient to ensure that said particles in interaction with said matrix form a three-dimensional gliding surface of the ski base, said gliding surface having a direction-dependent friction coefficient when said gliding surface is subjected to wear including a pretreated involving grinding said gliding surface in a direction from the front end thereof to the back and thereof, said longitudinal dimensions of said particles being of a maximum size less than the thickness of the ski base, and said particles forming mutually offset and spaced harder areas throughout said thickness, such that said areas become gradually exposed during wear of the ski base, thereby providing an effective configuration and friction coefficient of said gliding surface during the entire service life of the ski base such that said gliding surface provides good gliding properties in the ski forward direction with good grip properties in the backward direction of the ski.

2. A ski base as claimed in claim 1, wherein said matrix is of a material such that, during said wear of said gliding surface, bristles are formed on said matrix, which bristles are oriented rearwardly along said gliding surface during gliding movement of the ski base in a forward direction, and which bristles are raised to extend outwardly from said gliding surface during movement of the ski base in a rearward direction.

3. A skie base as claimed in claim 1, wherein at least a portion of said particles are inclined at an acute angle to said gliding surface.

4. A ski base as claimed in claim 1, wherein at least a portion of said particles extend substantially parallel to said gliding surface.

5. A ski base as claimed in claim 1, wherein said particles are evenly distributed throughout at least a substantial part of said thickness of the ski base.

6. A ski base as claimed in claim 1, wherein said particles comprise mica flakes.

7. A ski base as claimed in claim 1, wherein said particles comprise graphite flakes.

8. A ski base as claimed in claim 1, wherein said particles comprise glass flakes.

9. A ski base as claimed in claim 1, wherein said particles comprise wood shavings.

10. A ski base as claimed in claim 1, wherein said particles comprise flakes of a hard hydrophobic plastic material.

11. A ski base as claimed in claim 1, wherein said longitudinal dimension of said particles is 0.3–2.5 mm.

12. A ski base as claimed in claim 1, wherein said matrix has therein 2–8% carbon black.

13. A ski comprising said plastic composite ski base as claimed in claim 1.

* * * * *